(12) United States Patent
Royalty

(10) Patent No.: US 7,127,683 B2
(45) Date of Patent: Oct. 24, 2006

(54) METHOD TO DETECT APPLICATION SPOOFING IN MIXED USE AVIONICS DISPLAY

(75) Inventor: Charles D. Royalty, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 537 days.

(21) Appl. No.: 09/934,401

(22) Filed: Aug. 21, 2001

(65) Prior Publication Data

US 2003/0038844 A1   Feb. 27, 2003

(51) Int. Cl.
G06F 3/00 (2006.01)
G01C 23/00 (2006.01)
G01C 22/00 (2006.01)

(52) U.S. Cl. ............... 715/781; 715/741; 715/764; 701/3; 701/24

(58) Field of Classification Search ............ 345/708, 345/792, 790, 808, 809, 779, 781, 741, 764; 701/3, 24, 29, 200; 715/851, 792, 808, 809, 715/781, 741, 764
See application file for complete search history.

(56) References Cited

U.S. PATENT DOCUMENTS

| 5,757,371 | A | * | 5/1998 | Oran et al. | 345/779 |
| 5,828,373 | A | * | 10/1998 | Yves | 345/763 |
| 5,883,586 | A | * | 3/1999 | Tran et al. | 340/945 |
| 5,971,318 | A | * | 10/1999 | Lustre | 244/1 R |
| 6,112,141 | A | * | 8/2000 | Briffe et al. | 701/14 |
| 6,342,926 | B1 | * | 1/2002 | Hanafee et al. | 348/563 |
| 6,401,013 | B1 | * | 6/2002 | McElreath | 701/3 |
| 6,466,235 | B1 | * | 10/2002 | Smith et al. | 345/771 |

FOREIGN PATENT DOCUMENTS

EP   429387 A2 *   5/1991

* cited by examiner

Primary Examiner—Kristine Kincaid
Assistant Examiner—Ting Zhou
(74) Attorney, Agent, or Firm—Harness Dickey & Pierce P.L.C.

(57) ABSTRACT

A method to detect application spoofing in a mixed use avionics display by indicating when a mixed use avionics display is displaying information from a non-certified source. The method comprises providing an avionics display having a display area that is capable of displaying information from a non-certified source. A data connection is established between the non-certified source and the avionics display. Information is provided from the non-certified source to the avionics display through the data connection. The information from the non-certified source is then displayed on the display area so that less than the entire display area is used in displaying the information. The displaying of information from the non-certified source on less than the entire display area gives a visual indication that the information being displayed on the avionics display is from a non-certified source and susceptible to interference by a remote party and possible application spoofing.

12 Claims, 2 Drawing Sheets

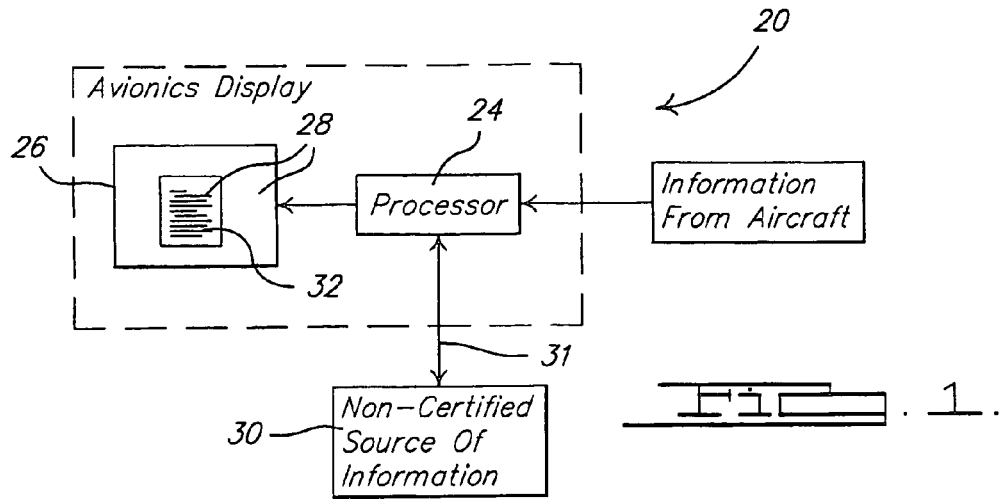
FIG. 1.
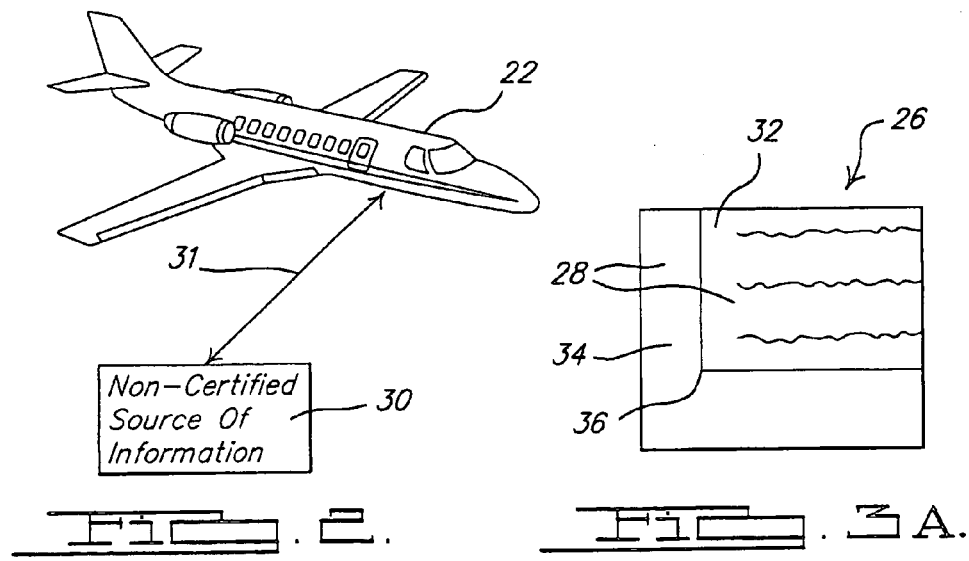
FIG. 2.
FIG. 3A.
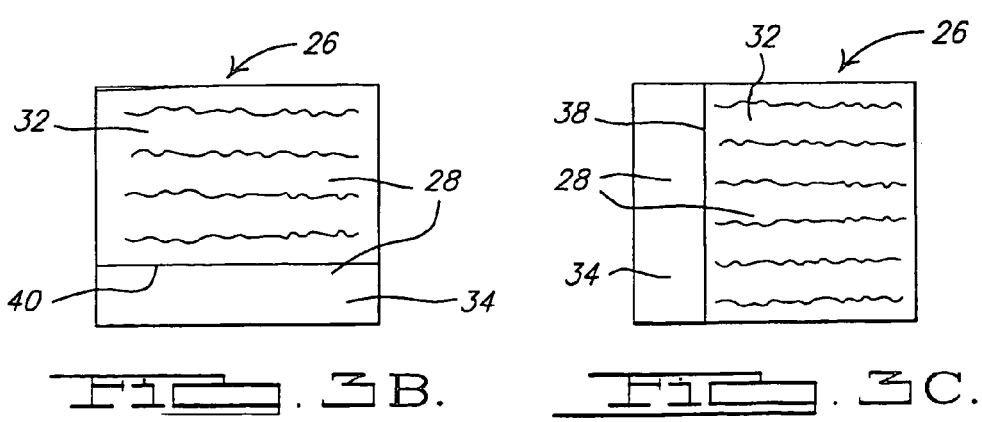
FIG. 3B.
FIG. 3C.

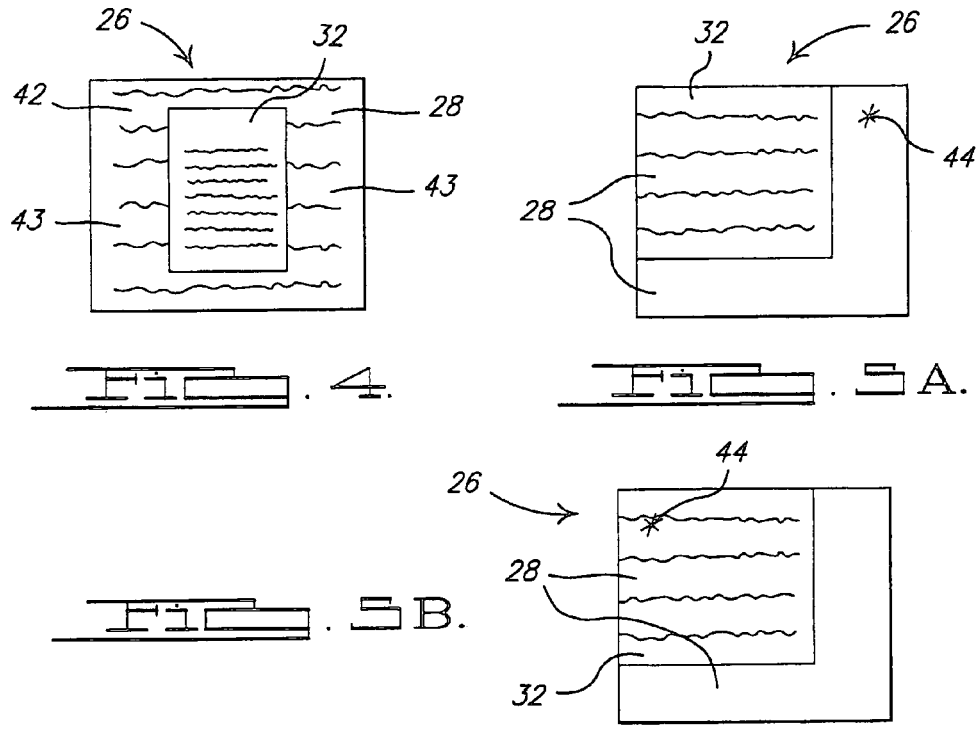
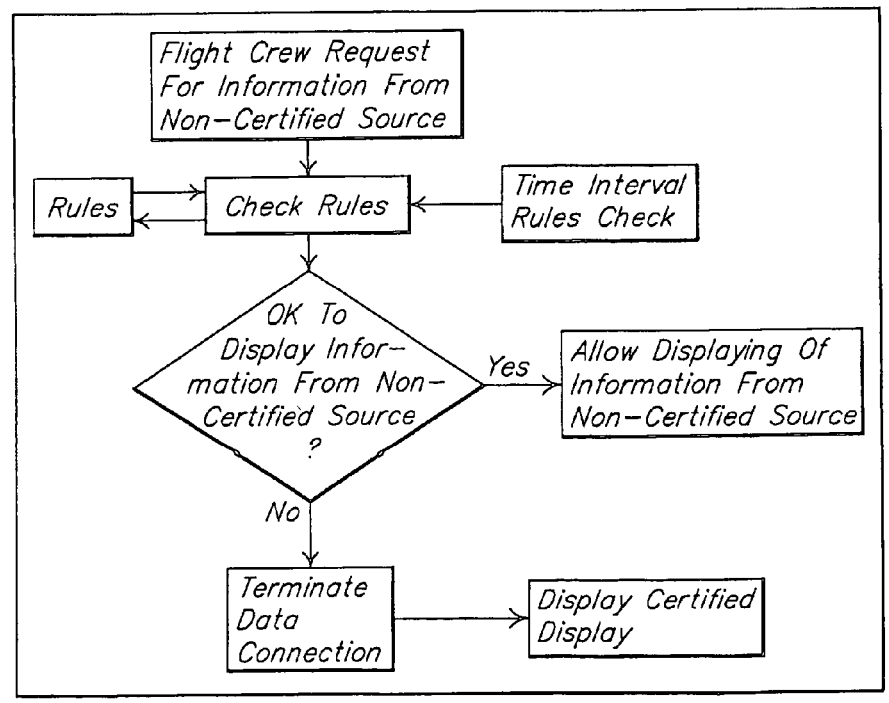

METHOD TO DETECT APPLICATION SPOOFING IN MIXED USE AVIONICS DISPLAY

TECHNICAL FIELD OF THE INVENTION

The present invention relates to methods of detecting application spoofing in a mixed use avionics display, such as a certified flight deck display.

BACKGROUND OF THE INVENTION

Airlines rely upon flight manuals, procedural manuals, and other manuals in the operation of its aircraft. These manuals are continually being revised, modified and supplemented by the airlines to maintain current standards for operation of the aircraft. These manuals are carried on the aircraft in paper form and are quite extensive in size and weight. The various manuals that are used in operating aircraft can weigh 100 pounds or more. Every pound of materials carried by an aircraft increases fuel consumption and the cost to operate the aircraft. Airlines are constantly looking for ways to reduce their operating costs and therefore it is desirable to minimize the weight that must be carried by the aircraft.

In an effort to reduce the weight of these manuals, airlines are increasingly relying upon the use of these manuals in electronic format. The manuals are converted into computer applications that are modifiable by the airlines, hereinafter referred to as Airline Modifiable Software (AMS). The AMS must receive approval from the regulatory agencies that oversee aircraft operation, such as the Federal Aviation Administration. These regulatory agencies approve the AMS for use in lieu of the paper manuals. In order to utilize the AMS, a display is required that can be viewed by the flight crew at various times during the operation of the aircraft.

The flight deck on an aircraft has numerous certified flight deck displays upon which the AMS could potentially be displayed. However, the AMS applications are not certified and are therefore not currently allowed to be displayed on a certified flight deck display. As a possible solution, an aircraft manufacturer could install additional certified displays on the flight deck that are dedicated to displaying the AMS. However, space is extremely limited on the flight deck and certified displays are expensive to build and have certified. Additionally, certified displays have been shown to not be cost effective when limited to non-essential functions, such as the AMS.

Another potential problem with using an existing certified flight deck display to display the AMS is that the AMS applications must be prevented from affecting the safe operation of the aircraft. AMS applications are increasingly expected to be provided by sources that are not in or on the flight deck. For example, AMS applications can be provided by an airline-controlled server which is installed on the airplane. However, the airline-controlled server may at times (during flight crew access or not) be connected to off board networks. These networks are open and therefore susceptible to malicious interference by remote parties that may go undetected. Because these networks are open, there is a possibility that a remote party could maliciously interfere with the safe operation of the aircraft by interfering with the displaying of the AMS on the existing certified display. For example, the malicious remote party could design an application that emulates or spoofs the certified display and have that application appear on the certified display with incorrect data instead of the AMS. The flight crew would think that the certified display was displaying the information for which the display is certified and believe that the inaccurate data is true and subsequently affect the safe operation of the aircraft.

Therefore, to limit the possibility of malicious interference by remote parties airlines have relied upon the use of carry-on personal electronic devices (PEDs), such as laptop computers, to run the AMS applications. The PED's could avoid the possibility of malicious interference by remote parties if the PED's were never connected to open networks. However, most PED's are at sometime connected to open networks and, therefore, exposed to malicious interference which may not be detected. The use of PEDs are also not without substantial drawbacks. As stated above, space is limited on a flight deck and the PEDs can interfere with the operation of the flight deck controls, particularly the control column. Additionally, the PEDs could present a hazard during turbulence in that the PEDs may injure a member of the flight crew or damage equipment. Furthermore, PEDs cannot be used during some phases of flight during which it may be desirable to have the AMS applications displayed. Finally, some PEDs will not be bright enough for sunlit conditions nor dim enough for nighttime use to facilitate efficient and comfortable use by members of the flight crew.

Therefore, it would be advantageous to an airline if it could use a certified flight deck display to display the AMS applications while preventing or at least detecting malicious interference by remote parties.

SUMMARY OF THE INVENTION

The present invention is directed to a method and apparatus that allows the mixed use of a certified avionics display to display information received from a non-certified source while allowing the detection of application spoofing, in accordance with preferred embodiments of the present invention. The method involves providing visual indications on the avionics display that alerts a member of the flight crew when the avionics display is being used to display information from a non-certified source and, therefore, may not be secure and is subject to potential malicious interference by a remote party.

In one preferred embodiment, the method comprises the providing of an avionics display that has a display area capable of displaying information from a non-certified source. Information from the non-certified source is provided to the avionics display by a data connection. The information from the non-certified source is then displayed on the display area so that less than the entire display area is used in displaying the information. Because less than the entire display area is used to display the information from the non-certified source, a member of the flight crew, when observing the avionics display, will be able to visually detect that the avionics display is currently being used to display information from a non-certified source and, as such, is susceptible to malicious interference by a remote party. Additionally, because the information is displayed on less than the entire display area, any attempt by a remote party to emulate or spoof the certified display for which the avionics display is certified would appear on less than the entire display area, unlike the certified display which appears on the entire display area, and would further indicate that the avionics display is not displaying the certified display, but rather is displaying information from the non-certified source and that application spoofing is occurring. Therefore, a member of the flight crew will avoid being misled by application spoofing occurring on the mixed use avionics display and can avoid any safety hazards which would have resulted from an undetected application spoofing.

Optionally, but preferably, the display area is partitioned so that at least a portion of the display area can not display the information from the non-certified source. The information from the non-certified source would then be displayed on less than the entire display area. The partitioning can be accomplished by providing the non-certified source of information with a false indication of the size of the display area. Because the non-certified source of information does not know the true size of the display area, the non-certified source is not capable of addressing the entire display area and, therefore, not capable of using the entire display area to display the information. Another method of partitioning the display area is by providing an avionics display that comprises a microprocessor. The microprocessor partitions the display area by limiting the area in which the information from the non-certified source can be displayed. Because the display area is partitioned by the microprocessor, information being provided from the non-certified source is not capable of being displayed on the entire display area and provides a visual indication to the flight crew of when the avionics display is displaying information from the non-certified source and is vulnerable to application spoofing.

In a different aspect of the present invention, the mixed use avionics display displays the certified display for which it is certified on the display area. The certified display is maintained on the display area while the avionics display simultaneously displays the information from the non-certified source. The information from the non-certified source is displayed on the display area in front of the certified display so that the information is visible on the avionics display and at least a portion of the certified display is also visible on the avionics display. A member of the flight crew is then able to see both a portion of the certified display and the display of the information from the non-certified source at the same time, and will be able to visually ascertain when information from the non-certified source is being displayed and if application spoofing is occurring.

In another aspect of the present invention, a visual indicator is displayed on the display area of the avionics display whenever information from a non-certified source is being displayed. The displaying of the information from the non-certified source is prevented from blocking the visual indicator so that the visual indicator is always visible on the display area when the information is being displayed. The flight crew will then have a visual indication of when the avionics display is displaying information from a non-certified source and is subject to malicious interference by a remote party and potential application spoofing.

In a different aspect of the present invention, application spoofing during critical periods of operation of an aircraft is avoided by preventing the displaying of information from a non-certified source on the avionics display during critical periods of operation. The method is accomplished by establishing rules that dictate when the avionics display can display information from a non-certified source. The avionics display is then prevented from displaying the information when the rules dictate that the avionics display should not display the information so that application spoofing can not occur. The rules can be established to correspond to applicable government regulations that govern the operation of an aircraft employing mixed use avionics displays. Additionally, the rules can go beyond the requirements of the government regulations and also dictate that the avionics display be prevented from displaying information from a non-certified source during any desired period of operation of the aircraft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a simplified block diagram drawing illustrating the components of the avionics display and its communication with a non-certified source of information;

FIG. 2 is a simplified diagram showing the communication between an aircraft and a non-certified source of information that is external to the aircraft;

FIGS. 3A–C are drawings of the visual display unit of FIG. 1 showing various methods of partitioning the display area;

FIG. 4 is a drawing of the visual display unit of FIG. 1 showing the simultaneous displaying of a certified display and of information from a non-certified source;

FIGS. 5A–B are drawings of the visual display unit of FIG. 1 showing the use of a visual indicator on the display to indicate the displaying of information from a non-certified source; and FIG. 6 shows the use of rules to control when information from a non-certified source can be displayed on the avionics display of FIG. 1.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, there is shown a simplified diagram of a typical avionics display 20 used in an aircraft 22. The avionics display 20 comprises a microprocessor 24 that provides information to a visual display unit 26. The visual display unit 26 has a display area 28 that is capable of displaying information received from the microprocessor 24.

In a certified flight deck display the avionics display 20 is dedicated to only displaying a certified display. These certified flight deck displays only receive information from certified sources on the aircraft 22 and not from a non-certified source 30. Because the certified flight deck display only receives information from the certified sources on the aircraft, there is no possibility of malicious interference with the certified flight deck display by a remote party. The avionics display 20 in FIG. 1 is a mixed use avionics display in that it is capable of displaying a certified display and of displaying information from a non-certified source 30. The avionics display 20 communicates with the non-certified source 30 via a data connection 31. The data connection 31 allows two way communication between the avionics display 20 and the non-certified source 30 so that a member of the flight crew can request and retrieve desired information from the non-certified source 30. The data connection 31 between the avionics display 20 and the non-certified source 30 can be by any means known to those skilled in the art.

The non-certified source 30 is preferably used to run the AMS applications and to provide these applications to the flight deck via the avionics display 20. The non-certified source 30 can be any source of information that is not a certified source of information. For example, the non-certified source 30 could be a portable computer carried on board the aircraft 22 and connected to the avionics display 20 by the data connection 31. The non-certified source 30 could also be an airline-controlled server which is installed on the aircraft 22. Additionally, the non-certified source 30 could also be located external to the aircraft 22. For example, the non-certified source 30 could be a server which runs the AMS software and is located in a ground based structure. In this case, the data connection 31 connects the avionics display 20 to the non-certified source 30 via wireless communication, as is known in the art. The non-certified source 30 is not certified as part of the aircraft's 22 type design. These non-certified sources may at times be connected to other sources that are open to remote parties. Because the non-certified source 30 may be exposed to an open connection, there is a potential for malicious interference with the information being sent from the non-certified source 30 to the avionics display 20. Thus, the non-certified source 30 can be exposed to malicious interference by a remote party which may not be detected by a member of the flight crew. The present invention allows a flight crew member to detect when the visual display unit 26 is displaying on the display area 28 information from the non-certified source 30. The flight crew member then knows that the information being provided should not emulate or spoof the certified display for which the avionics display 20 is certified.

In one aspect of the invention, as shown in FIG. 1, the displaying of the information from the non-certified source 30 on the display area 28 does not occupy the entire display area 28 so that the information from the non-certified source 30 is only displayed on a first portion 32 of the display area 28. More preferably, as shown in FIGS. 3A–C, the display area 28 is partitioned so that a second portion 34 of the display area cannot display the information from the non-certified source 30. The partitioning of the display area 28 into first and second portions 32, 34 can be accomplished in a number of different ways. Preferably, the partitioning of the display area 28 is accomplished by providing the non-certified source 30 with a false indication of the size of the display area 28 so that the non-certified source 30 is not capable of addressing the entire display area 28. As shown in FIG. 3A, providing the non-certified source 30 with a false indication of the size of the display area 28 can be accomplished by providing the non-certified source 30 with a false 0,0 corner display address 36 so that the non-certified source 30 is not capable of addressing the entire display area 28. Another way of partitioning, as shown in FIG. 3C, is by providing the non-certified source 30 with a false horizontal display size 38 so that the non-certified source 30 is not capable of addressing the entire display area 28. Still another way of partitioning, as shown in FIG. 3B, is by providing the non-certified source 30 with a false vertical display size 40 so that the non-certified source 30 is not capable of addressing the entire display area 28. While the method of partitioning the display area 28 by providing the non-certified source 30 with a false indication of the size of the display area 28 has been described as being accomplished by providing a false 0,0 corner display address 36, a false horizontal display size 38, and a false vertical display size 40, it should be understood that these methods are not mutually exclusive and can be combined in various combinations without departing from the scope of the invention. It should also be pointed out that the methods described are equally applicable to providing a false indication of the size of the display area 28 when other than Cartesian coordinates are used to address the display area 28, such as when polar coordinates are used.

An alternative way to partition the display area 28 so that the non-certified source 30 can not be displayed on the entire display area 28 is by use of the microprocessor 24. In this aspect of the invention, the non-certified source 30 can be provided with a correct indication of the size of the display area 28 but the microprocessor 24 limits the size of the first portion 32 for displaying information from the non-certified source 30 to less than the size of the entire display area 28 so that the second portion 34 of the display area can not be used to display information from the non-certified source 30. Regardless of which method is employed, the result is that only the first portion 32 of the display area 28 displays information from the non-certified source 30 while the second portion 34 of the display area 28 does not display information from the non-certified source 30 and thereby provides for a visual indication of when the avionics display 20 is displaying information from the non-certified source 30 and susceptible to application spoofing.

In another aspect of the invention, as shown in FIG. 4, the avionics display 20 has a certified display 42 displayed on the entire display area 28 at all times. The certified display 42 is maintained on the display area 28 while the information from the non-certified source 30 is simultaneously displayed on the first portion 32 of the display area 28. In this aspect of the invention, the information from the non-certified source 30 is displayed in front of or superimposed on the certified display 42 so that the information from the non-certified source 30 is visible on the avionics display 20 and at least a portion 43 of the certified display 42 is also visible on the avionics display 20. In this manner, a member of the flight crew, when visually perceiving the avionics display 20, will always see the portion 43 of the certified display 42 along with the information from the non-certified source 30 being displayed in front of or superimposed on the certified display 42 and know that the avionics display 20 is susceptible to application spoofing.

In yet another aspect of the invention, as can be seen in FIGS. 5A–B, a visual indicator 44 is displayed on the display area 28 whenever information from the non-certified source 30 is being displayed on the avionics display 20. The visual indicator 44 is displayed on the display area 28 in a manner that does not allow the displaying of information from the non-certified source 30 to block the visual indicator 44 so that visual indicator 44 is always visible on the display area 28 when the information from the non-certified source 30 is being displayed. The visual indicator 44 can be displayed on the display area 28 outside of the first portion 32 of the display area 28 that is displaying the information from the non-certified source 30. Alternatively, the visual indicator 44 can be displayed on the first portion 32 of the display area 28 that is displaying the information from the non-certified source 30. When the visual indicator 44 is displayed on the first portion 32 of the display area 28 that displays the information from the non-certified source 30, the visual indicator 44 is in front of or superimposed on the information so that the visual indicator 44 is always visible on the display area 28 whenever the information from a non-certified source 30 is being displayed on the avionics display 20. While the visual indicator 44 is shown as being an asterik, it should be understood that the visual indicator 44 does not need to be in the form of an asterik. For example, the visual indicator 44 can be another shape or even a band along the display or a frame that surrounds the display.

While the visual indicator 44 has been described as being displayed on the avionics display 20 in the display area 28, it is also possible to have the visual indicator 44 appear on the avionics display 20 but not in the display area 28. For example, the visual indicator 44 could be a light or some other indicator on the avionics display which would light up, glow, or, in some other fashion, indicate when the information being displayed on the avionics display 20 is from a non-certified source 30. However, having the visual indicator 44 not appear on the display area 28 presents a potential problem in that the visual indicator 44 could malfunction while the visual display unit 26 continues to function properly and a member of the flight crew could believe that the information being displayed on the display area 28 is a certified display when in reality the avionics display 20 is displaying information from a non-certified source 30 and could be susceptible to application spoofing. By having the visual indicator 44 appear on the display area 28 the visual indicator 44 will function when the visual display unit 26 is functioning and inform the flight crew when information is being displayed from the non-certified source 30. In this manner, the problem associated with a visual indicator that operates independently of the visual display unit 26 is avoided.

Another method of preventing application spoofing in a mixed use avionics display 20 is accomplished by establishing rules that dictate when the avionics display 20 can display information from the non-certified source 30 and when it can not. The avionics display 20 is then prevented from displaying information from the non-certified source 30 when the rules dictate that the avionics display 20 should not be displaying information from a non-certified source 30, such as when the aircraft 22 is in critical stages of operation.

Preferably, the rules are established based upon applicable government regulations that govern the operation of the aircraft 22. These rules can vary for each type of aircraft 22. The rules can also be modified as various government regulations change. Additionally, the rules can also be established based upon the particular safety protocols the owner of the aircraft 22 desires to implement in the operation of the aircraft 22. The rules would then dictate when a member of the flight crew would have access to viewing information from the non-certified source 30 on the avionics display 20. Because the applicable government regulations would require the avionics display 20 to display the certified display 42 on the visual display unit 26 during critical periods of operation of the aircraft 22, any malicious interference by a remote party would not occur during these critical periods of operation and application spoofing would not be a concern for the safe operation of the aircraft 22.

Referring now to FIG. 5, when a request is made by a member of the flight crew to view information from the non-certified source 30, the microprocessor 24 checks the rules to see if the rules allow for the displaying of information from the non-certified source 30 on the avionics display 20 during that stage of operation of the aircraft 22. If the rules indicate that information from the non-certified source 30 can be displayed on the avionics display 20, the microprocessor 24 allows the requested information from the non-certified source 30 to be displayed on the avionics display 20. Because the operational condition of the aircraft 22 is dynamic, when the avionics display 20 is displaying information from the non-certified source 30, the microprocessor 24 continues to monitor the operation of the aircraft 22 and compare the current status of the operation of aircraft 22 to the rules to ensure that it is still acceptable to display information from the non-certified source 30 on the avionics display 20. Microprocessor 24 can be programmed to intermittently and/or continuously monitor the operational condition of the aircraft 22 to perform this function. For example, the microprocessor 24 can be programmed to compare the operation of the aircraft 22 to the rules every 30 seconds, 60 seconds, 120 seconds, or what ever time interval is deemed appropriate to ensure the safe operation of the aircraft 22 and to prevent malicious interference by a remote party during critical stages of operation of the aircraft 22. Alternatively, the microprocessor 24 could be programmed to continuously monitor the operational status of the aircraft 22 and compare the operational status to the rules so that when the operational status of aircraft 22 changes to a condition wherein the avionics display 20 should not be displaying information from the non-certified source 30, the microprocessor 24 immediately prevents the displaying of information from the non-certified source 30.

When the rules indicate that information from the non-certified source 30 is not allowed to be displayed on the avionics display 20, the microprocessor 24 causes the avionics display 20 to display the certified display 42 for which it is certified and prevents the displaying of information from the non-certified source 30. Optionally, the microprocessor 24 could also be programmed to terminate the data connection 31 which is providing the information from the non-certified source 30 to the avionics display 20. The termination of the data connection 31 eliminates the possibility of malicious interference by a remote party with the avionics display 20. While the use of rules to dictate when information from the non-certified source 30 can be displayed on the avionics display 20 has been described with reference to the steps shown in FIG. 6, it should be understood that FIG. 6 is an example and there are other ways to use the rules to control when information from a non-certified source 30 is allowed to be displayed on the avionics display 20.

While the invention has been described in reference to allowing the displaying of AMS applications on the avionics display 20, it should be understood that the method is equally applicable to allowing the displaying of other applications from a non-certified source on the avionics display 20, such as from the internet.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of detecting application spoofing in a mixed use avionics display by indicating when the mixed use avionics display is displaying information from a non-certified source, the method comprising the steps of:

providing an avionics display having a display area that is capable of displaying information from a non-certified source;

displaying a certified display on the display area;

providing a data connection between the avionics display and the non-certified source;

providing information from the non-certified source to the avionics display;

displaying the information on the display area so that less than the entire display area displays the information;

maintaining the displaying of the certified display on the display area while simultaneously displaying the information from the non-certified source;

displaying the information on the display area in front of the certified display so that the information is visible on the avionics display, at least a portion of the certified display is visible on the avionics display and the information covers a portion of the certified display that would otherwise be displayed; and indicating to a user that application spoofing is possible by partitioning the display area so that at least a portion of the display area cannot display the information from the non-certified source.

2. The method of claim 1, wherein the step of partitioning the display area further comprises the step of:

providing the non-certified source with a false indication of the size of the display area so that the non-certified source is not capable of addressing the entire display area.

3. The method of claim 2, wherein the step of providing the non-certified source with a false indication of size further comprises the step of:

providing the non-certified source with a false display address so that the non-certified source is not capable of addressing the entire display area.

4. The method of claim 2, wherein the step of providing the non-certified source with a false indication of size further comprises the step of:

providing a false horizontal display size so that the non-certified source is not capable of addressing the entire display area.

5. The method of claim 2, wherein the step of providing the non-certified source with a false indication of size further comprises the step of:

providing a false vertical display size so that the non-certified source is not capable of addressing the entire display area.

6. The method of claim 1, wherein the avionics display is comprised of a visual display monitor and a computer processor and the step of partitioning the display area further comprises the step of:

the computer processor limiting the display area in which the information can be displayed.

7. The method of claim 1, further comprising the steps of:

displaying a visual indicator on the display area whenever the information is being displayed; and preventing the displaying of the information from blocking the visual indicator so that the visual indicator is always visible on the display area when the information is being displayed.

8. The method of claim 7, wherein the step of preventing the displaying of the information from blocking the visual indicator further comprises the step of:

displaying the visual indicator on a portion of the display area that is not used to display the information so that the visual indicator is always visible when displaying the information.

9. The method of claim 7, wherein the step of preventing the displaying of the information from blocking the visual indicator further comprises:

displaying the visual indicator on a portion of the display area that is used to display the information; and superimposing the visual indicator in front of the information being displayed so that the visual indicator is always visible when displaying the information regardless of a location within the display area in which the information is being displayed.

10. A method of allowing an aircraft certified flight deck display to be used as a mixed use avionics display by indicating when the certified flight deck display is displaying information from a non-certified source, the method comprising the steps of:

providing an aircraft having a certified flight deck display;

providing a data connection between the certified flight deck display and a non-certified source of information;

providing information from the non-certified source to the certified flight deck display;

limiting space on the certified flight deck display in which the information can be displayed so that an entire display area cannot be used to display the information by partitioning the display area so that at least a portion of the display area cannot display the information from the non-certified source;

providing the non-certified source with a false indication of the size of the display area so that the non-certified source is not capable of addressing the entire display area; and indicating that a potential for application spoofing exists by displaying the information in the limited space on the certified flight deck display.

11. The method of claim 10, further comprising the steps of:

displaying a certified display on the display area;

displaying the information from the non-certified source on the display area in front of the certified display; and maintaining the displaying of the certified display on the display area while simultaneously displaying the information from the non-certified source so that the information is visible on the certified flight deck display and at least a portion of the certified display is visible on the certified flight deck display.

12. The method of claim 10, further comprising the steps of:

placing a visual indicator on the display area whenever the information is being displayed; and preventing the displaying of the information from blocking the visual indicator so that the visual indicator is always visible on the display area when the information is being displayed.

* * * * *